T. OHARA.
URINAL.
APPLICATION FILED OCT. 15, 1920.
1,379,206.
Patented May 24, 1921.
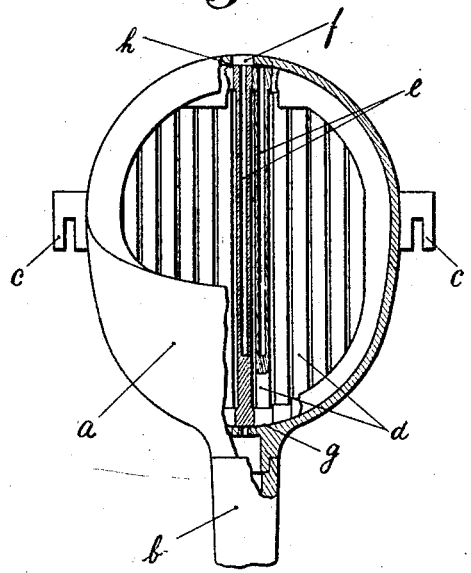
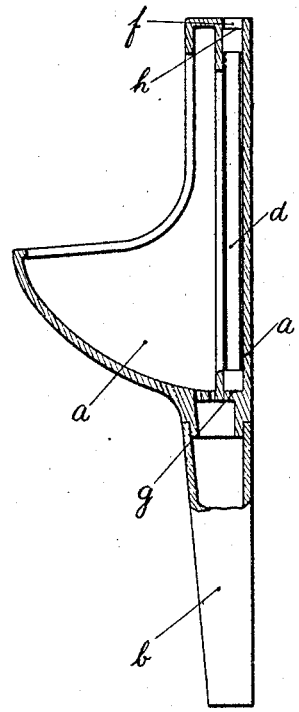
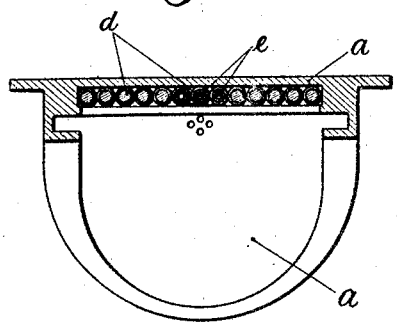
Inventor
Tomosuke Ohara
By Wm Wallace White
Attorney

UNITED STATES PATENT OFFICE.

TOMOSUKE OHARA, OF TOKYO, JAPAN.

URINAL.

1,379,206.  Specification of Letters Patent.  Patented May 24, 1921.

Application filed October 15, 1920. Serial No. 417,203.

*To all whom it may concern:*

Be it known that I, TOMOSUKE OHARA, a subject of the Emperor of Japan, residing at No. 25 Komagome-Hayashi-cho, Hongo-ku, Tokyo, Japan, have invented new and useful Improvements in Urinals, of which the following is a specification.

This invention relates to improvements in urinals, having a number of cylindrical rods arranged side by side, leaving a little clearance between each other, in the vertical side against which urination is made, and it has for its object to provide a urinal which prevents splashing.

The urinals of the hitherto known type have a vertical side of a plain or concave surface, so that, when discharge is made the splashes of urine are apt to spoil the floor or the clothes. In this invention, however, the vertical side is made of a number of cylindrical rods arranged side by side, leaving a little clearance between each other, and forming a number of small cylindrical surfaces. In consequence, when discharge is made the urine passes through the clearances between the rods very smoothly, along the cylindrical surfaces of the rods, and gets into the narrow space on the back of the rods. Thus, the urine does not splash.

Referring to the accompanying drawing, Figure 1 is a part sectional front view of a urinal according to my invention. Fig. 2 is a sectional side elevation of same, while Fig. 3 is a sectional plan of same.

In the drawing $a$ is the upper or funnel-shaped part of a urinal with brackets $c$ for fixing-screws, while $b$ is the lower tubular part connected with the bottom of said upper part. Along the bottom edge of the vertical side of $a$, a step or a groove $g$ is provided, while a groove $h$ is provided along the top edge of the same side, and a hole $f$ is perforated at the top of the groove $h$. $d$ are rods made of glass or porcelain, some of which may preferably have a hollow space $e$ in their bodies. The sectional form of the rods is made circular or semi-circular, hollow or solid, as to form a corrugated surface on the vertical side when they are arranged side by side on said side.

The rods rest on the step or groove $g$, and are held with their top ends in the upper groove $h$, in the manner as shown in the figures. The rods enlarge their diameters at both ends, so that, when they are arranged in their places, little clearance is made between the rods. When the rods $d$ have no enlarged ends, a distance piece should be inserted in between each rod in order to form a clearance therein.

The shorter rods may be arranged in their position from the front, but the longer rods in the central part should be inserted in their position through the hole $f$ after the shorter rods are arranged in theirs. If there are no shorter rods that can be inserted into the positions from the front, all of them must be inserted through the hole $f$ one by one.

The hollow spaces $e$ in some of the rods $d$ are reservoirs for disinfectant to be kept in.

What I claim is:—

1. A urinal having a number of cylindrical rods arranged side by side, leaving a little clearance between each other, in the vertical side of the urinal, against which side discharge is made.

2. A urinal having a number of semi-cylindrical rods arranged side by side with their convex sides on the surface, leaving a little clearance between each other, in the vertical side of the urinal, against which side discharge is made.

3. A urinal having a number of rods arranged side by side, leaving a little clearance between each other, in the vertical side of the urinal, one or more of the rods having a space made in their bodies in order to keep in disinfectant.

In testimony whereof I have signed my name to this specification.

TOMOSUKE OHARA.